May 27, 1969 A. M. HITCHCOCK ET AL 3,446,554

XEROGRAPHIC REPRODUCING APPARATUS

Filed Jan. 3, 1967 Sheet 1 of 5

INVENTORS
ALLEN M. HITCHCOCK
ROBERT W. THOMPSON
BY Donald F. Daley
Anthony D. Cennamo
ATTORNEYS INVENTORS
ALLEN M. HITCHCOCK
ROBERT W. THOMPSON
BY Donald F. Daley
Anthony D. Cennamo
ATTORNEYS

XEROGRAPHIC REPRODUCING APPARATUS

Filed Jan. 3, 1967

INVENTORS
ALLEN M. HITCHCOCK
ROBERT W. THOMPSON
BY
ATTORNEYS

INVENTORS
ALLEN M. HITCHCOCK
ROBERT W. THOMPSON
BY Donald J. Daly
Anthony W. Cerniano
ATTORNEYS INVENTORS
ALLEN M. HITCHCOCK
ROBERT W. THOMPSON
BY Donald F. Daley
Anthony D. Cennamo
ATTORNEYS 3,446,554
XEROGRAPHIC REPRODUCING APPARATUS Allen M. Hitchcock, Palmyra, and Robert W. Thompson, Penfield, N.Y., assignors to Xerox Corporation, Rochester, N.Y., a corporation of New York
Filed Jan. 3, 1967, Ser. No. 607,004
Int. Cl. G03b 27/62
U.S. Cl. 355—75 11 Claims

ABSTRACT OF THE DISCLOSURE

A computer forms advancing method and apparatus which is operable with a reproducing machine of the scanning type. A series of rollers move continuously over the scanning surface. The computer forms are formed into a loop between the rollers and the rollers advance the loop over the scanning surface while holding the portion of the forms behind the loop stationary with respect to the scanning surface. The stationary portion of the computer forms is scanned by the reproducing machine.

*Background*

This invention relates to a method and apparatus for feeding a continuous web of indefinite lengths to an optical scanning system and in particular to the method and apparatus for advancing a continuous series of fan folded forms across the surface of a platen on a reproducing machine while the individual form on the platen is being optically scanned.

More specifically, this invention relates to a method and apparatus for advancing computer tabulating printout stock or custom forms which are attached in the so called fan fold mode, that is, forms which have the leading edge of each form separably attached to the trailing edge of the preceding form. The forms are advanced across the exposure platen of a reproducing machine while the reproducing machine is scanning the surface of the individual form or document. Conventional computer print-out devices print on fan folded stock which has a series of perforations or drive holes along each edge. The perforations or drive holes are for the purpose of coacting with either a pin wheel or tractor drive mechanism which will advance the paper through conventional computer print-out devices. Mechanical printers utilizing type heads mounted on moving chains or type bars and which are actuated by hammers are normally employed for this purpose. Because of the mechanical force of the hammers on the type heads, a number of carbon copies of the original printed material may be made at the same time that the original copy is made. However, the number of carbons which can be made from a single pass is usually limited, for practical purposes, to about six and the quality of the carbon copies is considerably inferior to that of the original copy. It is therefore desirable to be able to produce a number of quality copies of the original material. To accomplish this on conventional reproducing equipment it would be necessary to either make a lithographic master of each sheet from the computer printer or separate these sheets and copy the sheets individually on conventional office copying or duplicating equipment. The latter method slows down the effective speed of the copying machine since the original form must be replaced after each set of copies.

It is highly desirable to be able to feed the individual sheets of a fan folded document onto the surface of a platen of a copying machine say for example, a xerographic reproducing machine such as that disclosed in copending application, Ser. No. 400,363. Machines of this type operate with a scanning rather than a full frame exposure of the document being reproduced. That is successive incremental areas of the document are illuminated and projected onto the surface of a rotating xerographic drum. The movement of the incremental area and the movement of the drum are synchronized so that the image flows onto the surface of the drum and there is no relative movement between the image and the surface. The scan of the document is accomplished by either moving the illumination source and the lens system or rotating a mirror which reflects a portion of the document through the lens system. In either of these types there is a very short return time to which the lamps or the mirror returns to the original position to start scanning the next document. In order to utilize the speed of the copying machine to its fullest it would be necessary to replace the original document on the platen with a new document to be scanned during the time that the mirror or the lights are on a return cycle returning from the end of scan position to the start of scan position. However, in order to make the most effective use of the machine during the production of repetitive copies of the same document the return time is deliberately kept to a minimum. Therefore the amonut of time available to change the document on the platen between the end of scan and the start of scan is very small. The present method and apparatus perform the changing of the documents to be scanned during the scan portion of the cycle rather than during the return time. Thus this invention eliminates the necessity of changing the document during the return time and enables a reproducing machine to copy separate documents at the maximum rate of usage of the machine, a rate which is normally achieved only for repetitive copies of the same document.

It is therefore the primary object of this invention to incrementally advance portions of continuous material across the platen of a reproducing apparatus.

It is also an object of this invention to duplicate fan folded computer forms.

It is a further object of this invention to advance computer forms across the platen of a copying machine during the scan portion of an operating cycle.

It is also an object of this invention to provide an apparatus for advancing fan fold material across the surface of a platen of a copying machine.

It is also an object of this invention to provide an apparatus which will enable a copying machine to operate at maximum speed and to make a single copy of individual documents or multiple copies of the same document upon request.

*Summary*

These and other objects of this invention are attained by means of a series of rollers which move across the platen of a copying machine advancing a loop of the document to be reproduced and a sprocket type of drive mechanism which will advance the fan fold material behing the rollers to produce a loop which may be advanced by a subsequent roller moving across the platen.

*Drawings*

For a better understanding of the invention as well as other objects and further features thereof, reference is had to the following detailed description of the invention to be read in connection with the accompanying drawings, wherein.

*Description*

The theory of operation of the present invention involves the relationship between the surface scanned and the surface onto which an optical image is being placed. In a machine of the type shown in FIG. 1 a xerographic drum is rotated and an incremental area of a document on the platen is scanned at a rate such that the optical image is stationary relative to the drum. That is, the speed of scan is synchronized with the rotational movement of the drum so that there is no relative movement between the incremental area of the image and the drum surface. In machines or devices which utilize full frame exposure the whole document is stationary with respect to the surface on which the image is to be produced. Relative movement between this surface and the image produces smearing of the image and gives blurred or unintelligible images. Even as full frame exposure requires that the whole document be stationary during the exposure cycle so also in the conventional or commercial machines which perform a scanning operation from a platen require that the entire document being scanned be held stationary. This means then that in order to utilize the maximum speed of the machine the document being scanned must be changed during the return time of the scanning number.

Figure 1:
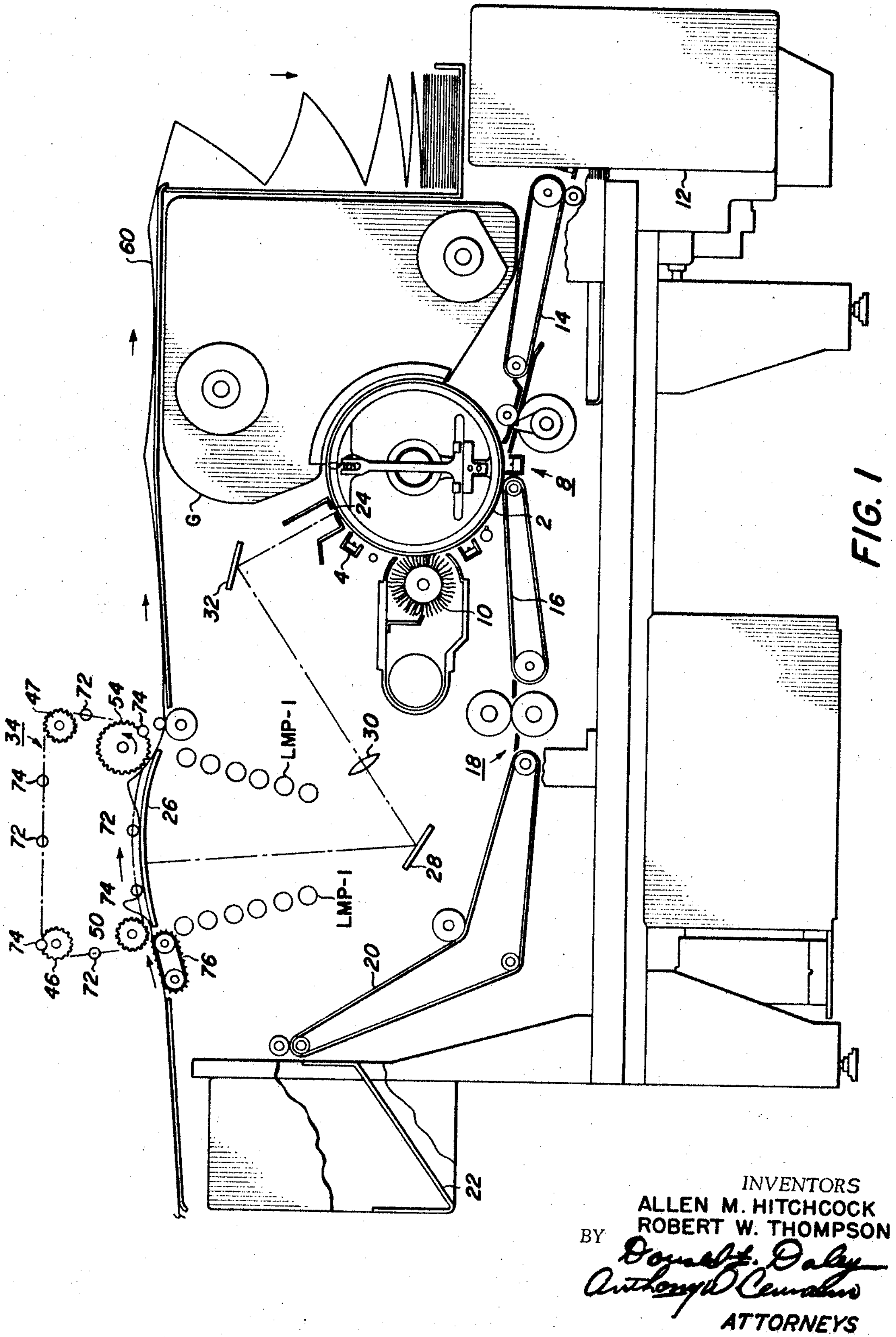
FIG. 1 is a schematic representation of a copying machine utilizing the present invention.

The present invention recognizes that this is not necessarily true and that the only area which has to be stationary with respect to the image-receiving surface is the incremental portion of the image being subjected to the scan at any given time. Except for the incremental area being scanned the remainder of the document may be moved or shifted in any manner so long as the incremental area being scanned is held stationary. Then by positioning the document on the platen just ahead of the portion being scanned and by advancing the document behind the portion being scanned so that the next document is in a position to be scanned at determination of the scan cycle. In actual practice the document or web is advanced behind the portion of the document being scanned at a rate greater than the scan rate so that the following document is elevated into a loop as seen in FIG. 1. The feeding of the web is controlled so that the trailing edge of that portion of the web which is to be scanned during the next cycle is properly positioned on the edge of the platen. Then the leading edge of that document and the trailing edge of the previous document are at a point near the top of the loop. With this setup a roller may be advanced just ahead of the portion being scanned and force the web down onto the platen into a stationary position. The roller leading the scan across the platen forces the loop forward advancing the web as it moves. A second roller just behind the portion of the document being scanned holds the document flat on the platen so that the web may be advanced behind this roller into another loop without disturbing the portion of the document being scanned. Continuously repeating this operation produces loops which rise and fall across the platen in a manner which resembles the movement of an inchworm. By placing a number of rollers which lead the scan and a number of rollers which trail the scan about a continuous chain above the platen a leading roller can be ready to start a scan at the time that the previous trailing roller is leaving the document at the end of the platen. In this manner the scanning can be kept continuous without having lost time due to advancing the web or changing the document.

FIG. 1 shows a schematic representation of a reproducing machine of a type suitable for use with the present invention. The machine shown is a xerographic reproducing machine though the present invention is usable with any type of machine wherein an image is scanned as opposed to one having full frame exposure. A xerographic machine of the type shown is disclosed in copending application S.N. 400,363. The machine shown in FIG. 1 consists of a rotating xerographic drum 2, a corona charging device 4, a xerographic developer 6, a transfer corotron 8, and a drum cleaning brush 10. Paper is fed from a paper feeder 12 into contact with the xerographic drum 2 at the transfer station 8 by means of a conveyor 14 and is carried away from the drum with an image thereon by the conveyor 16. The image is fused to the paper by means of a pressure roll fuser 18 and the document is carried to a tray 22 by a conveyor 20. The xerographic drum 2, after it has been uniformly charged by the corona charging device 4 is exposed to an optical image at point 24. The optical image at the point 24 originates from the original document to be reproduced which is on platen 26. The document on the platen 26 is illuminated by lamps LMP–1 and is incrementally scanned by a rotating mirror 28. The mirror 28 reflects incremental portions of the document on the platen 26 through a lens system 30 to a mirror 32 wherein it is reflected onto the surface of the drum 2 at point 24.

As seen in FIG. 1 a computer forms feeding device or a web feeding device indicated generally as 34 is positioned over the platen 26. The web feeder 34 is seen in detail in FIGS. 2 and 3. Referring now to those figures a pair of side frames 36 and 38 are spaced apart by a top cover 40 and an angle member 42.

A pair of shafts 46 and 56 mounted between the side frames 36 and 38 and journaled therein each support a pair of sprockets 50 and 54. A pair of continuous chains 52 extend around a series of sprockets forming a pair of continuous loops adjacent each of the side frames. The sprockets include idler sprockets 50 mounted on shaft 46, drive sprocket 54 on drive shaft 56, tensioning sprockets 46 and idler sprocket 47. The drive shaft 56 extends through the side plate 38 terminating in the output bore of clutch 106. The sprockets 54 provide the motive drive for the chains 52. The pair of tensioning sprockets 46 are mounted on stub shafts 62 and are urged into the chain 52 by means of springs 64 supported from brackets 66 mounted on the outside of the side frames 36 and 38. The springs 64 urge the stub shaft 62 to pivot about shaft 68 on lever arm 70. The tension produced by the spring 64 keeps the chains 52 taut and in engagement with the drive sprockets 54. Spaced about the chain 52 are a series of rollers herein shown as a series of eight rollers. The rollers are all rotatably journaled in the chain and four of the rollers 72 are lead rollers and four of the rollers 74 are trailing rollers. The rollers are identical in construction and the designation lead and trailing rollers is merely to indicate which roller precedes the area of scan and which roller trails the area of scan. The rollers are spaced so that the distance between the lead roller 72 and the following trailing roller 74 is a distance slightly larger than the incremental area of scan on the platen 26. The distance between the trailing roller 74 and the following lead roller 72 is less than the amount of the web of material which is to be scanned on each cycle of operation. Therefore, before the trailing roller 74 leaves the forward edge of the document on the platen the following lead roller 72 engages the document on the portion of the platen near the start of scan position.

Figure 2:
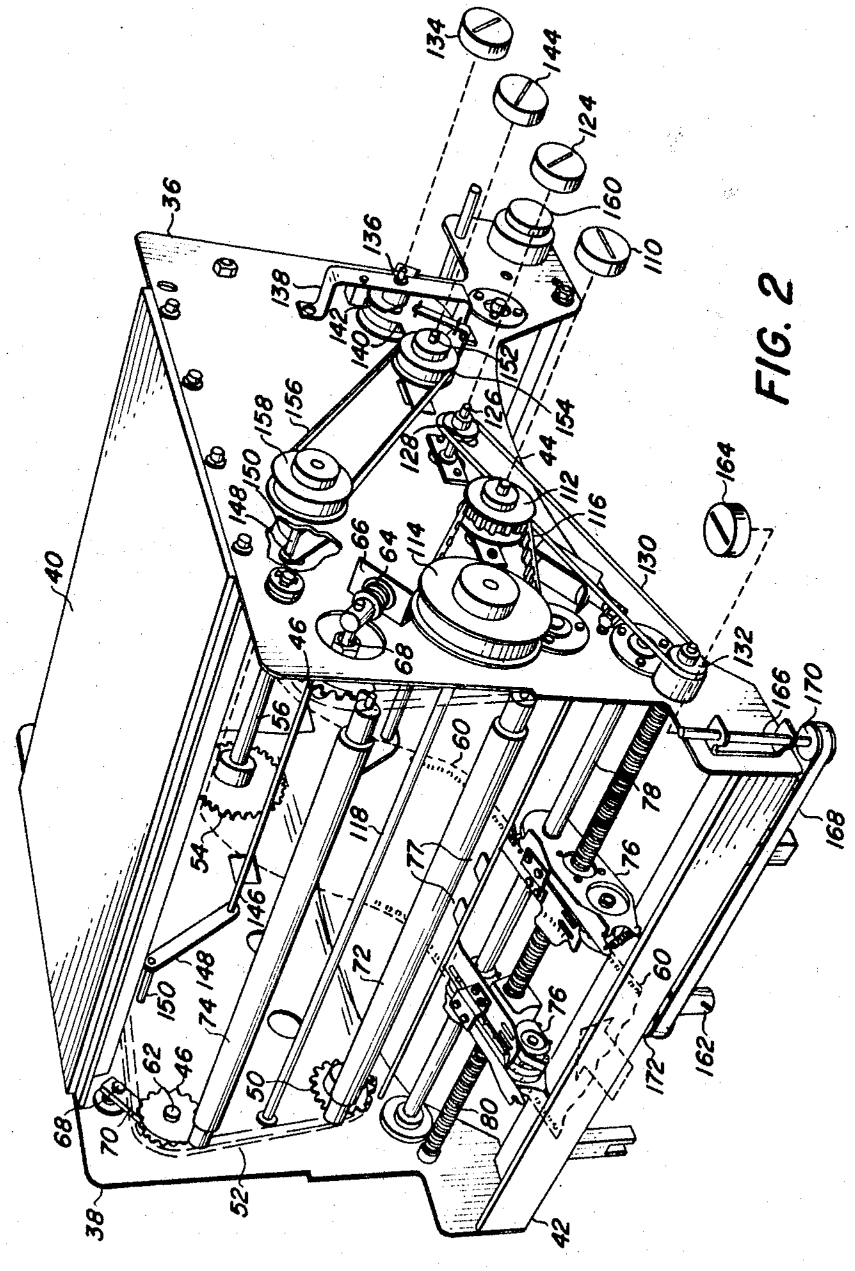
FIG. 2 is a perspective view of the computer forms feeding device showing the front and side view of the apparatus.
Figure 3:
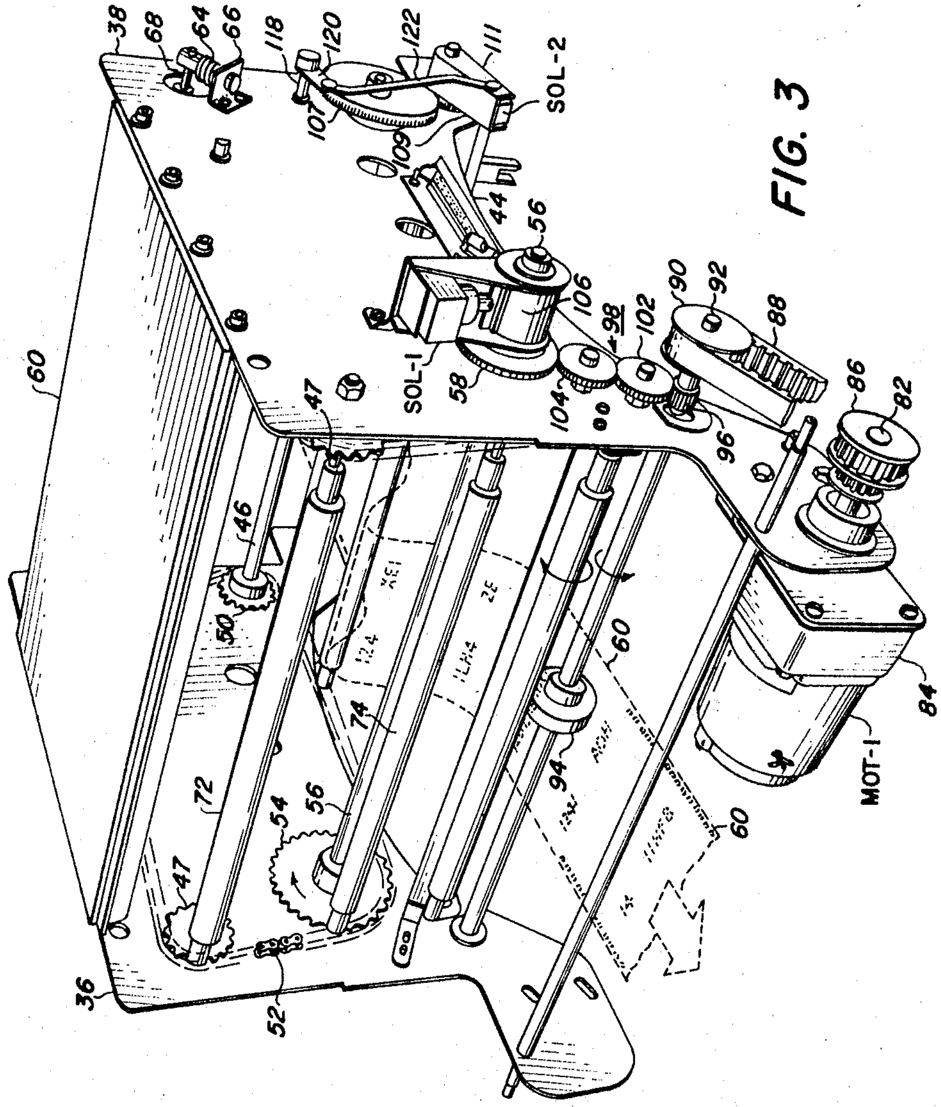
FIG. 3 is a perspective view showing the rear and side view of a copying machine utilizing the present invention.

A web of fan fold paper consists of a series of sheets connected together trailing edge to leading edge and folded or perforated to form a crease between each sheet. The sheets are stacked in accordion style so that as one sheet is advanced each subsequent sheet follows along in the form of a continuous web. A continuous fan fold form is shown as 60 in FIG. 1 and is shown in dotted lines in FIGS. 2 and 3. Normal computer tabulating print-out stock or custom forms have a series of perforations along each edge to permit feeding by a tractor drive or a pinwheel drive which has a series of pins which extend through the holes and move the paper forward. A pair of tractor drives 76 are shown in FIGS. 1 and 2 and are used to advance the web of computer forms from a stack onto the platen 26. Tractor drives of this type are well known in the art and are not described in detail herein. However, it is sufficient to point out that a series of pins are mounted on a chain in a continuous loop and are positioned relative to the forms being fed so that the pins extend through the holes in the form and as the chain is driven forward the pins advance the web in the direction of drive. As seen in FIG. 2 the tractor drives 76 are mounted on a splined shaft 78 and longitudinally slidable thereon. The splined shaft 78 is driven as described below and drives the tractor drives 76. A lead screw 80 is mounted in each of the side frames and extends through the tractor drives. Rotation of the lead screw 80 causes the tractor drives to move in opposite directions that is, in towards each other or both away from each other. Thus, the tractor drives may be positioned to accommodate various size of webs or computer forms 60.

A web lifter 77 on a shaft 79 is positioned beneath the web material to lift the web to assist in the formation of a loop as the tractor drive 76 advances the web. Rotational movement of the shaft 79 at the start of movement of the tractor drive, causes lifters 77 to direct the web upwards forming the loop.

The motor MOT–1 mounted on the side frame 38 provides the power to drive the chains 52, the tractor drive 76 and feed-out roll 94. The motor MOT–1 drives a shaft 82 through a gear box 84. A timing belt pulley 86 is mounted on the end of the shaft 82 and a drive timing belt 88 which drives a second pulley 90 mounted on a shaft 92. The shaft 92 is journaled in the side frames 38 and 36 and has a friction drive roll 94 mounted in the middle thereof to drive the web 60 off of the platen 26. A small gear 96 is also mounted on the shaft 92 and drives a gear train 98 which consists of intermediate gears 102 and 104 and driven gear 58. The gear 58 is mounted on the input hub of clutch 106 and drives the shaft 56 and sprockets 54 through the clutch 106 which is mounted on the shaft. The clutch 106 is controlled by a solenoid 101 which is responsive to the logic control system of the main reproducing machine. That is, when only one copy of each sheet of the computer form is to be made the solenoid SOL–1 is actuated after each scan cycle so that the chains 52 and rollers 72 and 74 are driven through another cycle. However, if more than one copy is to be made of each form then the solenoid SOL–1 is actuated for the first and last scan of each sheet and is held inoperative for the subsequent scans of each sheet so that the computer form is not advanced until the number of copies desired for each sheet has been made. For example, if three copies are to be made of each sheet of the computer form then at the beginning of the first sheet the solenoid is actuated coupling the gear 58 to the shaft 56 by the clutch 106. At the start of the second scan the solenoid SOL–1 is not actuated so that the chains 52 do not rotate advancing the form 60. At the start of the third and last scan of the programmed number of copies for each sheet of document 60, the solenoid SOL–1 is actuated.

The tractor drives 76 are driven from the motor MOT–1 through the gear train 98 and the clutch 106, sprockets 54 and chains 52 to a gear 107. The gear 107 meshes with a smaller gear 109 which is the input hub of indexing clutch 111. The gear 109 drives the shaft 78 through the indexing clutch 111 which is mounted on the splined shaft 78. Rotation of the splined shaft 78 drives tractor drives 76 advancing the computer forms. The starting position of the form or the position of the perforations in the computer form relative to the platen may be adjusted by a knob 110 seen in FIG. 2. The knob 110 is mounted on a small stub shaft containing a timing belt pulley 112. The pulley 112 drives a timing belt 116 which in turn rotates a larger pulley 114 mounted on a shaft 118. Rotational movement of the knob

110 is carried through the pulleys and timing belt and shaft 118 to the opposite side of the mechanism wherein rotation of the shaft 118 turns a lever arm 120 which in turn rotates the frame of the indexing clutch 111 through a connecting arm 122. Movement of the knob 110 acts as a vernier to make minor adjustments within a range of plus or minus ¼″ to the vertical position of the computer form or web on the platen.

Also seen in FIG. 2 is a knob 124 which is used to adjust the position of the tractor drives 76 depending on the width of the paper or computer form that is being fed. The knob 124 is mounted on a stub shaft 126 which carries a pulley 128. The pulley 128 drives a belt 130 which in turn drives a pulley 132 mounted on the end of the lead screw 80. Rotation of the knob 124 therefore produces rotation of the lead screw 80 which in turn moves the tractor drives inward or outward to the desired position for the size computer form to be used.

A knob 134 controls the amount of paper that is advanced for each scanning cycle. The knob 134 is mounted on a shaft 136 journaled between the side frame 36 and a bracket 138. A cam 140 is mounted concentrically with the shaft 136 and is rotated by the shaft 56 which is driven by the chains 52. A pair of reed switches are positioned to be actuated by the cam 140 and are electrically connected in series in the circuit to the indexing clutch 111. One of the switches is mounted to the frame 36 in a fixed position and the second switch is mounted on a member 142 which is connected to the knob 134 to be rotated therewith. Therefore rotation of the knob 134 produces a change of the relative position of the switches. The switches are magnetic switches and are either exposed to a magnet thus closing a switch or shielded from a magnet by the cam 140. The switches are electrically connected so that when both switches are closed the logic control system of the main reproducing machine can actuate SOL–2 which controls indexing clutch 111 which drives the tractor drives 76 and when one switch is open the indexing clutch 111 is released stopping the paper feed. Therefore the relative position of the movable switch controls the amount of paper that is fed during each cycle of operation. The logic control system allows the paper to feed only during the last copy programmed.

The knob 144 controls the position of a baffle bar 146. The operation of the baffle bar is described below. The bar 146 extends between a pair of movable arms 148 which are connected to shafts 150 mounted in the side frames. The knob 144 is mounted on a shaft 152 containing a pulley 154 which drives belt 156 and pulley 158. The pulley 158 is mounted on the shaft 150 so that rotation of the knob 144 produces movement of the baffle bar 146.

The entire sheet feeding apparatus is pivotally mounted on a frame member 160 secured to the main copying machine. The entire housing may be pivoted about the member 160 to allow access to the platen 26. The frame in the normal operating position is locked or secured down on top of the platen by means of a locking device 162. The locking device can be released by means of a knob 164 mounted on a shaft 166 which actuates the lock 162 through a belt 168 and a pair of pulleys 170 and 172.

*Operation*

Figures 4, 5, 6:
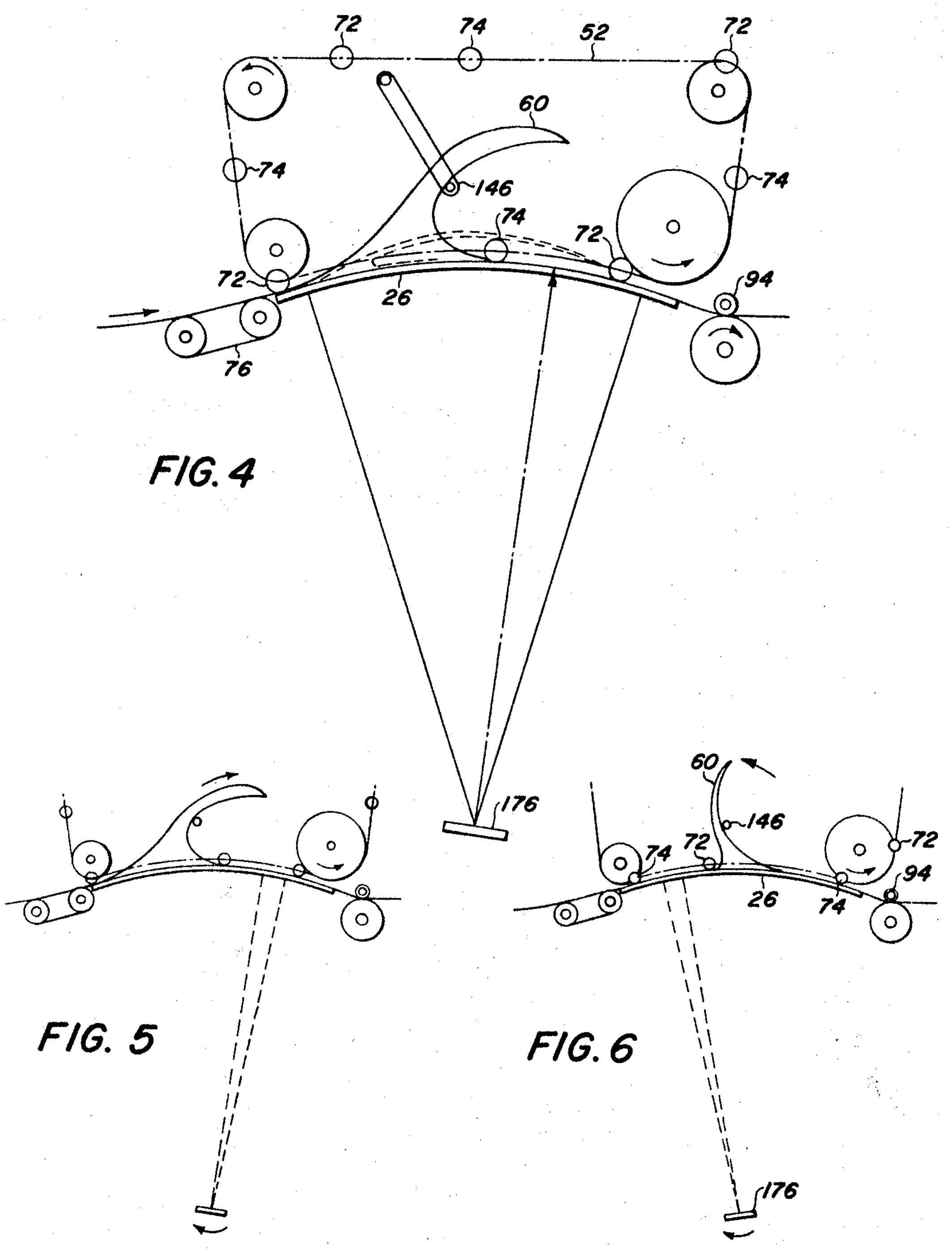
FIGS. 4 through 10 are schematic representations of the position of the web material relative to the optical scanning and the feeding apparatus.

FIGS. 4 through 10 show a schematic arrangement of the operation of the invention. As can be seen in the schematics a rotating mirror 176 located in the main copying machine scans the document located on the platen 26. The mirror 176 performs a series of oscillating motions so that incremental portions of the document on the platen are successively scanned and the mirror returns to again scan the next document starting at the initial position. The extremes of the scan are shown in FIG. 4 and the relative location of the lead roll 72 and trailing rollers 74 is also seen in FIG. 4 at the start of the scan position. A lead roller 72 has just contacted the document and the platen 26 and the mirror 176 is scanning the document near the end of scan position. At the end of the scan position the mirror 176 moves back to the start of scan position as seen in FIG. 5. The leading roller 72 which was in contact with the platen has advanced and one of the trailing rollers 74 is now in contact with the platen and the document 60 has been smoothed down on the surface of the platen between the two rollers. The mirror 176 is positioned to scan the area of the document between the rollers 72 and 74 and the movement or rotation of the mirror is synchronized with the forward movement of the two rollers 72 and 74 so that the area of the document between the two rollers is scanned throughout the cycle. It can be seen from FIGS. 4 and 5 that the web or computer form 60 has been advanced in a loop ahead of the roller 72. To prevent the loop from falling to the position shown by the dotted line in FIG. 4 the baffle bar 146 is arranged to catch the loop and hold it in an elevated position so that the roller 72 rolls the loop out onto the platen rather than forming a crease in rolling over the loop. The action of the baffle bar 146 is necessary for very thin or light web materials. Heavier stock does not require the use of the baffle bar 146 and, as indicated above, the baffle bar may be removed from a functional position by rotation of the knob 144 not shown in FIG. 4.

Figure 7:
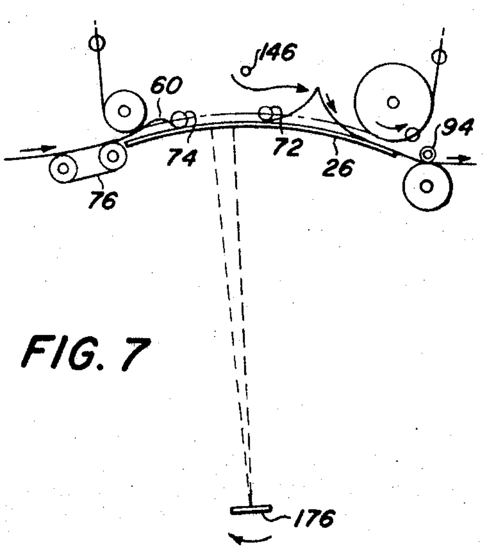
Figure 8:
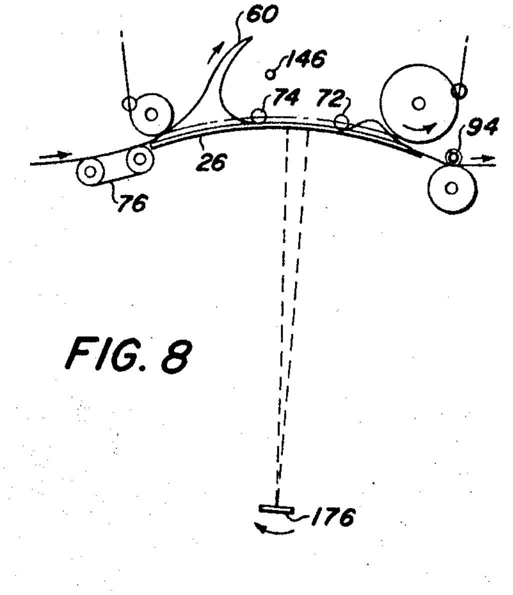
Figure 9:
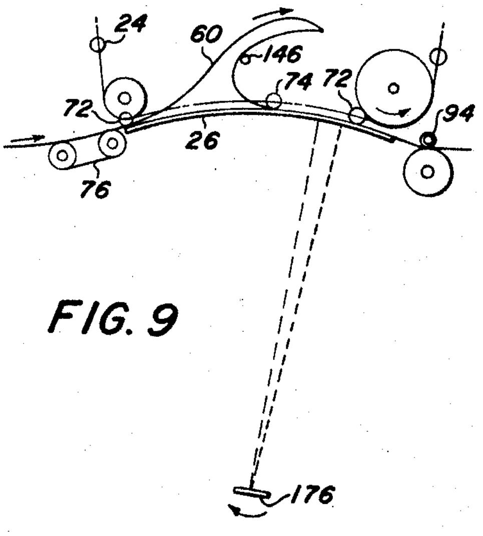
Figure 10:
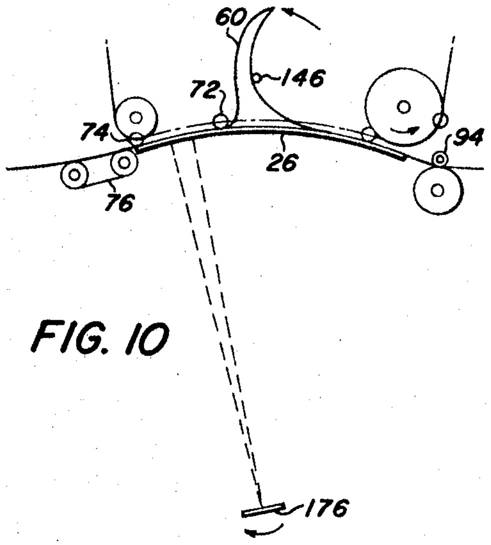

As the mirror 176 rotates and the rollers 72 and 74 advance towards the middle or end of scan position the tractor drives 76 advance the paper, as seen in FIG. 7, forming a small bump or loop behind the trailing roller 74. During this time the lead roller 72 has been forcing the loop ahead of it down into the platen 26 and the friction roll 94 has been drawing the web of material which was previously scanned off the platen. As movement of the rollers 72 and 74 and the mirror 176 continues to the position shown in FIG. 8 the tractor drives 76 continue to force the web 60 up into a loop behind the roller 74 and the loop ahead of the roller 72 is proportionately being drawn off the platen. FIG. 9 shows the position of the rollers and the mirror just prior to termination of the scan. The roller 72 is just ready to leave the surface of the platen and the mirror 176 is just ready to return to the start of scan position. The next leading roller 72 has just contacted the platen and the computer form and the loop is formed ahead of the roller and is supported by the baffle bar 146. Then in the last step completing one cycle of operation the mirror 176 has returned to the start of scan position. The next lead roller 72 and trailing roller 74 have contacted the platen smoothing out a portion of the computer form for scanning purposes.

During the entire operation a portion of the computer form 60 is held in contact with the surface of the platen and for scanning purposes the portion of the computer form between the leading roller 72 and the trailing roller 74 is stationary so that during scanning there is no relative movement of the portion of the form being scanned. However, the remaining portion of the form is either being forced into a loop behind the trailing roller 74 by the tractor drive 76 or is being rolled down onto the platen by the leading roller 72 from a loop formed during the previous scanning cycle. As the rollers 72 and 74 leave the surface of the platen 76 they are carried around on the chains 52 as shown in FIG. 4. Thus there is continually new rollers being fed onto the surface of the platen for continuous operation.

When more than one copy is to be made of the particular portion of the computer form being scanned the tractor drive 76 is not activated by the clutch mechanism 111 and does not drive the computer forms forward behind the roller 74 as seen in FIG. 7. Therefore, the entire form being scanned is stretched tight by the friction roll 94 across the surface of the platen. The mirror 176 merely goes through the repetitive scanning cycle and the rollers 72 and 74 continue to advance across the surface of the platen but since no loop is formed by the tractor drive 76 the computer form does not advance. When the proper number of copies have been made the tractor drive is again initiated and the computer form is advanced during the last scanning cycle so that at the beginning of the next scan cycle a new form is positioned on the platen.

While the invention has been described with reference to the structure disclosed herein, it is not confined to the details set forth, and this application is intended to cover such modifications or changes as may come within the purposes of the improvements or the scope of the following claims.

What is claimed is:

1. A method of advancing a web of material across a surface and simultaneously acting on a portion of the web comprising:
- forming the web of material to be advanced into a loop having a crest and a valley,
- advancing the loop across the surface so that the web material in the valley following the loop is stationary relative to the surface across which the web is being advanced,
- acting on the portion of the web material that is stationary with respect to the surface,
- and simultaneously creating a new loop of the web material to be subsequently advanced.

2. The method of claim 1 wherein the web is optically scanned during advancement by scanning the portion of the web in the valley as the loop is moved across the surface.

3. A method of advancing a web of material across a surface and simultaneously scanning a portion of the web comprising:
- creating a loop in the web material to be advanced,
- moving the loop across the surface by forcing sequential portions of the web material following the loop into contact with the surface,
- optically scanning the portion of the web material in contact with the surface,
- and forming a new loop behind a portion of the web in contact with the surface for subsequent advancement across the surface.

4. The method of claim 3 further including the step of making multiple scans of the same material by repeating the optical scanning step prior to the formation of a new loop.

5. A method of reproducing a continuous web of material on a scanning type of reproducing machine having a platen input comprising:
- creating a loop of the material to be scanned over the platen of a reproducing machine,
- forcing an incremental strip of the material at the trailing edge of the loop against the platen at the start of scan position by forcing a pair of rollers down onto the material against the platen,
- advancing the rollers across the platen so that successive portions of the loop of material are forced into contact with the surface of the platen,
- the movement of the rollers being coordinated with the movement of the scan of the reproducing machine so that the portion being scanned is always in contact with the platen,
- forcing a loop of material up behind the pair of rollers when a new portion of the web is to be scanned to thereby create a loop for the next scan cycle.

6. Apparatus for advancing a continuous web of material across a surface including:
- roller means adapted to move across the surface in contact with a web of material on the surface,
- means to index the web of material into a loop over the surface and
- drive means to advance the roller means across the surface forcing movement of the loop across the surface.

7. The apparatus of claim 6 wherein the roller means comprises a series of rollers arranged to move in a continuous path across the surface over which a web of material is to be advanced, and the indexing means is coordinated with rollers to advance the web of material into a loop between the rollers.

8. The apparatus of claim 7 wherein the surface over which the web of material to be moved is the platen of an optical reproducing machine and the web of material is optically scanned when it is forced into contact with the platen by the rollers.

9. A computer forms feeding device for advancing a continuous web of computer forms onto and off of the platen of a scanning type of reproducing machine while the forms are being optically scanned including:

a series of rollers mounted in pairs defining a scan area and positioned to contact the plate surface, means to move the rollers through a continuous path of movement including a portion wherein the rollers move in contact across the surface of the platen, and means to index the web of material to form a loop containing a computer form to be scanned between the pairs of rollers whereby movement of the rollers across the platen forces the web material in the loop into contact with the platen for scanning and advances the loop across the platen.

10. The apparatus of claim 9 further including means to support the top of the loop to prevent the loop from collapsing in front of the rollers.

11. Apparatus of claim 10 wherein the means to support the loop consists of a bar extending between the side of the frame members in a position to contact the front side of the loop.

References Cited

UNITED STATES PATENTS 3,358,555 12/1967 Call ---------------- 88—24

NORTON ANSHER, *Primary Examiner.*

W. A. SIVERTSON, *Assistant Examiner.*

U.S. Cl. X.R.

226—113; 355—77